(12) United States Patent
Kohli

(10) Patent No.: US 10,896,422 B2
(45) Date of Patent: Jan. 19, 2021

(54) SYSTEMS AND METHODS FOR DETECTING COLLUSION BETWEEN MERCHANTS AND CARDHOLDERS

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 301 days.

(21) Appl. No.: 15/366,705

(22) Filed: Dec. 1, 2016

(65) Prior Publication Data
US 2018/0158062 A1 Jun. 7, 2018

(51) Int. Cl.
G06Q 20/40 (2012.01)
G06Q 30/04 (2012.01)
G06Q 40/02 (2012.01)

(52) U.S. Cl.
CPC ....... *G06Q 20/4016* (2013.01); *G06Q 20/405* (2013.01); *G06Q 30/04* (2013.01); *G06Q 40/025* (2013.01)

(58) Field of Classification Search
CPC ............. G06Q 20/4016; G06Q 40/025; G06Q 30/0248; G06Q 20/40
See application file for complete search history.

(56) References Cited

U.S. PATENT DOCUMENTS

| | | | |
|---|---|---|---|
| 5,819,226 A | 10/1998 | Gopinathan et al. | |
| 8,676,684 B2 | 3/2014 | Newman et al. | |
| 9,396,465 B2 | 7/2016 | Hammad | |
| 9,754,255 B1 * | 9/2017 | Ma | H04W 12/06 |
| 2003/0195843 A1 * | 10/2003 | Matsuda | G06Q 20/04 705/39 |
| 2004/0030644 A1 | 2/2004 | Shaper | |
| 2009/0222308 A1 | 9/2009 | Zoldi et al. | |
| 2011/0066551 A1 | 3/2011 | Bruesewitz et al. | |
| 2011/0251951 A1 * | 10/2011 | Kolkowitz | G06Q 20/10 705/39 |
| 2015/0170148 A1 * | 6/2015 | Priebatsch | G06Q 20/4016 705/44 |
| 2015/0242856 A1 * | 8/2015 | Dhurandhar | G06Q 50/01 705/44 |

OTHER PUBLICATIONS

PCT International Search Report and Written Opinion, Application No. PCT/US2017/058426, dated Jan. 24, 2018, 10 pps.

* cited by examiner

*Primary Examiner* — Hao Fu
(74) *Attorney, Agent, or Firm* — Armstrong Teasdale LLP

(57) ABSTRACT

A collusion analytics (CA) computing device including a processor and a memory in communication with the processor is provided. The processor receives transaction data associated with a candidate transaction of a candidate merchant and a candidate cardholder, retrieves merchant data associated with the candidate merchant from a database, generates collusion analytics data based at least partially on the merchant data, detects potential collusion between the candidate merchant and the candidate cardholder based on the generated collusion analytics data, and transmits a collusion alert to an user computing device when potential collusion is detected.

19 Claims, 9 Drawing Sheets

| MERCHANT ANALYTICS DATA | SCORING | CALCULATIONS | SCORE VALUE |
|---|---|---|---|
| Identify Merchant Type | | | 0 |
| Digital Only | 0 | | |
| POS | 1 | | |
| POS-Digital | 1 | | |
| Sold Product | | | 1 |
| Digital Product | 0 | | |
| Physical Delivery | 1 | | |
| Merchant Participation Time in Payment Network | | | 1 |
| Greater than 6 Months | 1 | | |
| Less than 6 Months | 0 | | |
| Unique Cards / Total Transactions | | ((20/50)*100) | 0 |
| Greater than 25% | 0 | | |
| Less than 25% | 1 | | |
| Unique BIN / Unique Cards | | ((5/20)*100) | 1 |
| Greater than 10% | 1 | | |
| Less than 10% | 0 | | |
| Unique Proxy IPs used / Total Transactions | | ((25/50)*100) | 1 |
| Greater than 40% | 1 | | |
| Less than 40% | 0 | | |
| Unique Delivery Addresses /Total Deliveries | | ((15/50)*100) | 1 |
| Greater than 25% | 1 | | |
| Less than 25% | 0 | | |
| Authenticated Transactions / Total Transactions | | ((35/50)*100) | 1 |
| Greater than 70% | 1 | | |
| Less than 70% | 0 | | |
| Authentication Types / Authenticated Transactions) | | ((25/35)*100) | 1 |
| Greater than 50% | 1 | | |
| Less than 50% | 0 | | |
| Transactions in High Risk Authentication Regions / Total Transactions | | ((0/50)*100) | 1 |
| Greater than 50% | 0 | | |
| Less than 50% | 1 | | |

| CARDHOLDER ANALYTICS DATA | SCORING | SCORE VALUE |
|---|---|---|
| Transaction Made via Wallet or Stand-alone | 1 or 0 | 0 |
| History Transaction Logged for Similar Merchant Category | 1 or 0 | 1 |
| History Transaction Logged on Same Price-Point | 1 or 0 | 0 |
| Previous Chargeback Associated with Card / Cardholder | 1 or 0 | 1 |
| Successfully Authenticated Transaction across other Merchant | 1 or 0 | 1 |

| COLLUSION SCORING | |
|---|---|
| Total Merchant Collusion Score | 90% (9/10) |
| Total Cardholder Collusion Score | 60% (3/5) |
|  |  |
| Final Score {( 70% of 90 + 30% of 60)} | 81 |
|  |  |
| Risk Ranges | |
| Score > 70 | Accept |
| Score Between (40-70) | Additional Challenge |
| Score < 40 | Decline |

| | SCORING | CALCULATIONS | SCORE VALUE | | MERCHANT DATA | |
|---|---|---|---|---|---|---|
| MERCHANT ANALYTICS DATA | | | | | | |
| Identify Merchant Type | | | 0 | | Merchant Type | Digital Only |
| Digital Only | 0 | | | | Product Type | Physical |
| POS | 1 | | | | Merchant Participation | 1 year |
| POS-Digital | 1 | | | | Total Transactions | 50 |
| Sold Product | | | 1 | | Unique Card | 20 |
| Digital Product | 0 | | | | Unique BINs | 5 |
| Physical Delivery | 1 | | | | Unique Proxies | 25 |
| Merchant Participation Time in Payment Network | | | 1 | | Total Deliveries | 50 |
| Greater than 6 Months | 1 | | | | Unique Delivery Addresses | 15 |
| Less than 6 Months | 0 | | | | Authenticated Transactions | 35 |
| Unique Cards / Total Transactions | | ((20/50)*100) | 1 | | Transactions with Strong Authentication | 25 |
| Greater than 25% | 0 | | | | Transactions in High Risk Authentication Region | 0 |
| Less than 25% | 1 | | | | CARDHOLDER DATA | |
| Unique BINs / Unique Cards | | ((5/20)*100) | 1 | | Transaction Mode | Non-Wallet |
| Greater than 10% | 1 | | | | Transaction History with Similar Merchant | Yes |
| Less than 10% | 0 | | | | Transactions with Similar Price Point | No |
| Unique Proxies / Total Transactions | | ((25/50)*100) | 1 | | Previous Chargeback History | No |
| Greater than 40% | 1 | | | | Authenticated Across Other Merchants | Yes |
| Less than 40% | 0 | | | | COLLUSION SCORING | |
| Unique Delivery Addresses / Total Deliveries | | ((15/50)*100) | 1 | | Total Merchant Collusion Score | 90% (9/10) |
| Greater than 25% | 1 | | | | Total Cardholder Collusion Score | 60% (3/5) |
| Less than 25% | 0 | | | | | |
| Authenticated Transactions / Total Transactions | | ((35/50)*100) | 1 | | Final Score {( 70% of 90 + 30% of 60)} | 81 |
| Greater than 70% | 1 | | | | Acceptable Risk Ranges | |
| Less than 70% | 0 | | | | Score > 70 | Accept |
| Authentication Types / Authenticated Transactions | | ((25/35)*100) | 1 | | Score Between (40~69) | Additional Challenge |
| Greater than 50% | 1 | | | | Score < 40 | Decline |
| Less than 50% | 0 | | | | | |
| Transactions in High Risk Authentication Regions / Total Transactions | | | 1 | | | |
| Greater than 50% | 0 | | | | | |
| Less than 50% | 1 | | | | | |
| CARDHOLDER ANALYTICS DATA | | | | | | |
| Transaction Made via Wallet or Stand-alone | 1 or 0 | | 0 | | | |
| History Transaction Logged for Similar Merchant Category | 1 or 0 | | 1 | | | |
| History Transaction Logged on Same Price-Point | 1 or 0 | | 0 | | | |
| Previous Chargeback Associated with Card / Cardholder | 1 or 0 | | 1 | | | |
| Successfully Authenticated Transaction across other Merchant | 1 or 0 | | 1 | | | |

SYSTEMS AND METHODS FOR DETECTING COLLUSION BETWEEN MERCHANTS AND CARDHOLDERS

BACKGROUND

The field of the present disclosure relates generally to detecting collusion in payment systems, and more particularly, detecting collusion between merchants and cardholders.

In current payment processing systems, it is possible for merchants and cardholders to collude together to commit fraudulent activities. More specifically, merchants and cardholders may collude together to enable the cardholder to receive one or more products and the merchant to be fully reimbursed by a third party for the products. For example, a cardholder may purchase a product from a merchant using a payment card. After the transaction is authenticated and authorized, the cardholder may report to an issuing bank of the cardholder that the transaction was not performed by the cardholder despite the product being shipped to or in possession of the cardholder. Subsequently, the merchant informs the issuing bank that authentication of the cardholder had occurred during the transaction. The issuing bank may then be liable for the transaction and is responsible to pay the merchant back for the transaction. Thus, the cardholder keeps the purchased product and the merchant receives payment for the product from the issuing bank. In this situation, the issuing bank is the party taking the loss while the colluding merchant and cardholder are paid and receive the product, respectively.

There are at least some known systems that attempt to prevent collusion among merchants and cardholders in a payment card scenario. However, these known systems are passive systems, and merely monitor merchants and/or cardholders that have been manually identified to the system as potential colluders based upon a previously known fraudulent activity of the merchant and/or cardholder. These known systems typically monitor a blacklist of merchants and/or cardholders that have previously been identified as potential colluders. These known systems are not able to identify potential collusion without having the blacklist provided to the system. Obliviously, these known systems have major flaws. For example, colluding merchants and cardholders are easily able to avoid being caught by these known systems by either varying or altering their method of collusion. In addition, these known systems are unable to prevent collusion by new colluders, who are not included on the blacklist. Therefore, a system is needed to detect collusion before the transaction is completed such that legitimate parties to the transactions are not defrauded by the collusion.

BRIEF DESCRIPTION

In one aspect, a collusion analytics (CA) computing device including a processor and a memory in communication with the processor is provided. The processor receives transaction data associated with a candidate transaction of a candidate merchant and a candidate cardholder, retrieves merchant data associated with the candidate merchant from a database, generates collusion analytics data based at least partially on the merchant data, detects potential collusion between the candidate merchant and the candidate cardholder based on the generated collusion analytics data, and transmits a collusion alert to an user computing device when potential collusion is detected.

In another aspect, a method for detecting potential collusion between a candidate merchant and a candidate cardholder is provided. The method is at least partially performed by a CA computing device. The method includes receiving transaction data associated with a candidate transaction of a candidate merchant and a candidate cardholder, retrieving merchant data associated with the candidate merchant from a database, generating collusion analytics data based at least partially on the merchant data, detecting potential collusion between the candidate merchant and the candidate cardholder based on the generated collusion analytics data, and transmitting a collusion alert to a user computing device when potential collusion is detected.

In yet another aspect, at least one non-transitory computer-readable storage media having computer-executable instructions embodied thereon is provided. When executed by at least one processor, the computer-executable instructions cause the processor to receive transaction data associated with a candidate transaction of a candidate merchant and a candidate cardholder. The computer-executable instructions further cause the processor to retrieve merchant data associated with the candidate merchant from a database, generate collusion analytics data based at least partially on the merchant data, detect potential collusion between the candidate merchant and the candidate cardholder based on the generated collusion analytics data, and transmit a collusion alert to a user computing device when potential collusion is detected.

BRIEF DESCRIPTION OF THE DRAWINGS

FIGS. 1-10 show example embodiments of the methods and systems described herein.

FIG. 1 is a schematic diagram illustrating an example collusion analytics (CA) platform including a multi-party payment processing system and a CA system for detecting collusion between merchants and cardholders.

FIG. 2 is a block diagram of the CA system shown in FIG. 1.

FIG. 3 is an example table including merchant analytics data for use with the system shown in FIG. 2.

FIG. 4 is an example table including cardholder analytics data for use with the system shown in FIG. 2.

FIG. 5 is an example table including collusion score calculations generated by the system shown in FIG. 2.

FIG. 6 is an expanded block diagram of an example embodiment of a remote device for use in the system shown in FIG. 2.

FIG. 7 illustrates an example configuration of a host system for use in the system shown in FIG. 2.

FIG. 8 is a flowchart of an example method for detecting potential collusion between merchants and cardholders using the system shown in FIG. 2.

FIG. 9 is a diagram of components of one or more example computing devices that may be used in embodiments of the described systems and methods.

FIG. 10 is an example model for use with the system shown in FIG. 2.

DETAILED DESCRIPTION

Figure 1:
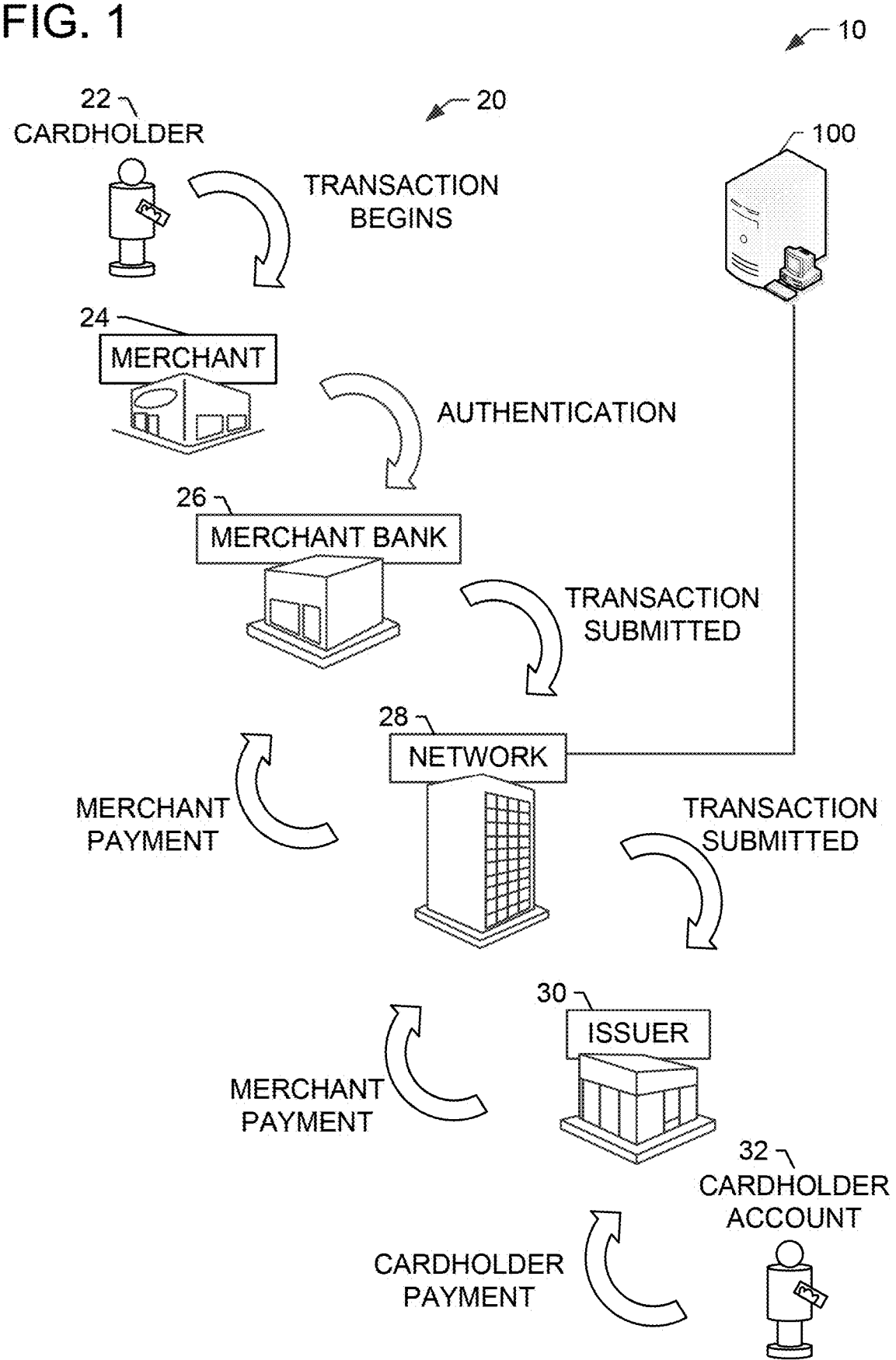

The following systems and methods described herein relate generally to detecting collusion in payment systems, and more particularly, detecting collusion between merchants and cardholders.

The system described herein (referred to as a "collusion analytics (CA) system") is configured to profile transactions and detect collusion between certain parties involved in the transactions. More specifically, the CA system is configured to generate metrics, scores, and other analytics associated with transaction data and merchant data for one or more transactions. Based on the generated analytics, the CA system determines whether or not collusion has potentially occurred with a transaction. The CA system is configured to detect collusion associated with card-not-present (CNP) transactions and other transactions in which the merchant and cardholder attempt to shift fraud liability (as part of the normal online payment process) to an issuer. In the example embodiment, the CA system is configured to provide a collusion detection service to a user (e.g., an issuer) to proactively detect collusion between merchants and cardholders. The collusion detection is an opt-in service that issuers and other users enroll with the CA system to use. In other embodiments, the CA system automatically enrolls users for the service and provides the users with the option to opt-out of the service. In certain embodiments, the collusion detection service includes one or more features or subservices (e.g., particular collusion analytics) described herein that the user may selectively opt-in or opt-out of, thereby facilitating a customized service for each user.

The CA system includes a CA computing device. The CA computing device includes a processor in communication with a memory. The CA computing device is also in communication with at least one database for storing information associated with historical transaction data, merchant data, and cardholder data. The transaction data is associated with one or more transactions previously performed or initiated by a cardholder. The transaction data may include, but is not limited to, a transaction amount, a date and time stamp, a primary account number (PAN), a form of payment (e.g., digital wallet, payment card, etc.), a cardholder identifier, and a merchant identifier. The transaction data further includes information unrelated to payment for a particular transaction, such as an internet protocol (IP) address and browser type of a cardholder that is collected from the hypertext transfer protocol (HTTP) header associated with the cardholder automatically during the transaction. The merchant data may include transaction information associated with the merchant, such as merchant type (e.g., POS, digital only, or POS and digital sales), merchant product category, and other merchant-related data. The cardholder data may include historical transaction data associated with a particular cardholder or payment account.

The CA computing device is configured to receive transaction data from a payment processor of a payment network. More specifically, the payment processor facilitates communication between parties within the payment network to complete transactions using messages that adhere to specific protocols of the payment network. The payment network extracts the transaction data from at least some messages and transmits the extracted transaction data to the CA computing device. Alternatively, the CA computing device may be configured receive the messages from the payment processor and extract the transaction data. In the example embodiment, the messages include authorization messages that are transmitted through the payment network to request authorization of a corresponding transaction. In one example, the authorization messages include ISO® 8583 compliant messages and ISO® 20022 compliant messages. As used herein, "ISO®" refers to a series of standards approved by the International Organization for Standardization (ISO is a registered trademark of the International Organization for Standardization of Geneva, Switzerland). ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for data elements. ISO® 20022 compliant messages are defined by the ISO® 20022 standard. For example, ISO® 20022 compliant messages may include acceptor to issuer card messages (ATICA).

In one embodiment, the transaction data is associated with a user registered for the collusion detection service provided by the CA system, such as an issuer. In other embodiments, the CA computing device may receive the transaction data from another computing device. Alternatively, the CA computing device may be part of the payment processor and is configured to process the transaction data over the payment network. In the example embodiment, the CA computing device is configured to analyze transaction data of each transaction processed by the payment processor for collusion prior to authorization of the transaction. In other embodiments, the CA computing device is configured to analyze a subset of transactions for collusion. As used herein, a "candidate transaction" refers to a transaction that is analyzed by the CA computing device for collusion. The transaction data of the candidate transactions is associated with at least one candidate merchant and at least one candidate cardholder. Based on the transaction data, the CA computing device retrieves merchant data associated with the candidate merchant. In some embodiments, the CA computing device also retrieves cardholder data associated with the candidate cardholder.

Based upon the retrieved merchant and cardholder data associated with the candidate transaction, the CA computing device is configured to generate collusion analytics data. The collusion analytics data includes a plurality of data elements that are generated by aggregating, deriving, analyzing, and/or otherwise manipulating the transaction, merchant, and cardholder data. Each data element of the collusion analytics data is associated with a specific, predefined factor that may indicate potential collusion between the candidate merchant and the candidate cardholder.

In the example embodiment, the collusion analytics data is separated into merchant analytics data and cardholder analytics data. In other embodiments, the collusion analytics data may have a different configuration. The merchant analytics data indicate factors of collusion associated with the candidate merchant. For example, the merchant analytics data may include, but is not limited to, a merchant type, a product delivery type, a merchant payment participation duration, a number of unique cards, a number of unique bank identification numbers (BINs), a number of unique IP addresses or proxies, a number of unique delivery addresses, a number of authenticated transactions, a number of authentication types, and an authentication region. Merchant type is the type of storefronts provided by the merchant, including POS (i.e., brick and mortar stores), digital only, and POS and digital. Product delivery type indicates whether the purchased product is delivered physically or digitally to the cardholder. The merchant participation duration indicates how long the merchant has been collecting payments. The number of unique cards, BINs, IP addresses, unique delivery addresses, authenticated transactions, and authentication types compared to the total number of transactions or deliveries to detect potential collusion if the numbers are above or below a predefined threshold. The authentication region indicates whether or not the merchant is conducting transactions in which the cardholder and/or merchant are present within a geographical region that has been identified as a high risk region for fraudulent activity.

The cardholder analytics data may include, but is not limited to, a payment method (e.g., digital wallet, payment card, etc.), historical transactions, a chargeback history, a fraud history, and an authentication history. In particular, the cardholder analytics data indicate whether the candidate cardholder has previously purchased products from merchants in a similar product category (e.g., hardware, electronics, etc.) as the candidate merchant and at a similar price point as the candidate transaction. The cardholder analytics data also indicates if the cardholder has previously performed a chargeback or reported fraud. The authentication history indicates if the candidate cardholder has been previously authenticated for other purchases.

The CA computing device is configured to detect potential collusion between the candidate merchant and candidate cardholder by analyzing the generated collusion analytics data. In at least some embodiments, the CA computing device is configured to calculate a collusion confidence score associated with the candidate merchant and candidate cardholder. The collusion confidence score indicates a confidence or likelihood that potential collusion between the candidate merchant and candidate cardholder is occurring. The collusion confidence score is calculated by assigning a score value to each data element of the collusion analytics data. For some data elements, one or more predefined thresholds are compared to the data element to assign a corresponding score value. For example, the CA computing device compares the number of unique delivery addresses to the total number of deliveries to determine a collusion value. In one example, the collusion value is determined based on comparing the number of unique delivery addresses per the total number of deliveries to a predefined threshold of 25%. The collusion value may be a binary or Boolean value. That is, the collusion value either indicates no collusion or potential collusion. In the above example, if the percentage is greater than the predefined threshold, then the number of unique delivery addresses does not indicate collusion. Otherwise, if the percentage is equal to or less than the predefined threshold, the number of unique delivery addresses would indicate potential collusion. Alternatively, the collusion value may be a different type of value other than a binary value. Each collusion value is aggregated together to form the collusion confidence score. In one embodiment, weighting factors are applied to at least some collusion values to emphasize or deemphasize certain collusion values. The issuers enrolled in the collusion detection service may have control of the weighting factors to facilitate customized analysis of the collusion analytics data. In some embodiments, the issuers can choose which data elements of the collusion analytics data are used to calculate collusion confidence scores. For example, one issuer may only wish to use collusion values based on transaction history of the cardholder and merchant rather than collusion values based on product delivery history.

In certain embodiments, the CA computing device generates a merchant collusion score and a cardholder collusion score based on the calculated collusion values to calculate the collusion confidence score. The merchant collusion score is associated with the merchant analytics data and the cardholder collusion score is associated with the cardholder analytics data. The collusion confidence score is calculated by combining the merchant collusion score and the cardholder collusion score together. In some embodiments, weighting factors are applied to the merchant and cardholder collusion scores to calculate the collusion confidence score. In other embodiments, the collusion confidence score is derived the merchant and cardholder collusion scores using a different function.

In the example embodiment, the CA computing device is further configured to detect potential collusion between the candidate merchant and the candidate cardholder based on the collusion analytics data. If a collusion confidence score has been calculated, the CA computing device compares the collusion confidence score to one or more predetermined confidence thresholds. The confidence thresholds indicate levels of confidence that the candidate transaction is legitimate (i.e., no collusion) or that potential collusion is likely. In some embodiments, the thresholds are set by each user enrolled in the service to provide customized collusion detection. Based on the comparison with the predetermined confidence thresholds, the CA computing device is configured to generate one or more alerts for the payment processor or other computing devices in communication with the CA computing device.

For example, the CA computing device may compare the collusion confidence score to a pair of predetermined thresholds. The thresholds create three regions to assign a collusion confidence score to: (i) a region indicating acceptable risk, (ii) a region indicating supplementary authentication challenges are required, and (iii) an unacceptable risk region. Based on the comparison, if the collusion confidence score is within the acceptable risk region, collusion is unlikely and the CA computing device transmits an alert to the payment processor indicating that the candidate transaction may proceed. If the collusion confidence score is within the region indicating supplementary authentication challenges are required, the CA computing device transmits a challenge alert to the payment processor to cause a supplementary challenge to be provided to the candidate cardholder before processing the candidate transaction. That is, the supplementary challenge is used to provide additional confidence that the legitimate cardholder is initiating the transaction. In the example embodiment, if the cardholder is authenticated using the supplementary challenge, the issuer may authorize the transaction and standard liability shift (i.e., liability shifts to the issuer) is applied to the candidate transaction. In some embodiments, the supplementary challenge may at least partially shift the liability of the candidate transaction. If the cardholder is not authenticated using the supplementary challenge, the CA computing device notifies the payment processor to decline the candidate transaction. If the collusion confidence score is within the unacceptable risk region, the CA computing device transmits a collusion alert to the payment processor indicating potential collusion between the candidate merchant and cardholder. The payment processor declines the purchase and/or notifies a third party of the potential collusion, such as a merchant or issuing bank associated with the candidate merchant and candidate cardholder, respectively.

The methods and systems described herein may be implemented using computer programming or engineering techniques including computer software, firmware, hardware or any combination or subset thereof, wherein the technical effects may be achieved by performing one of the following steps: (i) receive transaction data associated with a candidate transaction of a candidate merchant and a candidate cardholder prior to authorization of the candidate transaction; (ii) retrieve merchant data associated with the candidate merchant and cardholder data associated with the candidate cardholder from a database; (iii) generate collusion analytics data based at least partially on the merchant data and the cardholder data; (iv) calculate a cardholder collusion score and a merchant collusion score based on the generated collusion analytics; (v) apply a first weighting factor to the cardholder collusion score and a second weighting factor to the merchant collusion score; (vi) calculate a collusion confidence score based on the cardholder collusion score with the first weighting factor and the merchant collusion score with the second weighting factor; (vii) compare the collusion confidence score to a first predetermined threshold and a second predetermined threshold; (viii) transmit a challenge alert to at least one of a payment network associated with the transaction data and a user computing device associated with a financial institution when the collusion confidence score is between the first and second predetermined thresholds; and/or (ix) transmit a collusion alert to the user computing device when potential collusion is detected based on the comparison to the first and second predetermined thresholds.

The systems and methods described herein are configured to facilitate (a) proactive detection of potential collusion between merchants and cardholders; (b) supplementary authentication of cardholders for transactions with increased risk of potential collusion; (c) reduced number of fraudulent collusion between merchants and cardholders; and (d) detection of collusion without requiring the merchant or cardholder to be previously identified as potential colluders.

Moreover, the systems and methods described herein are configured to provide technical improvements to payment processing systems and product distribution systems. For example, the systems and methods facilitate (a) improved speed, bandwidth, and efficiency of the payment network by reducing the number of fraudulent transactions and disputes processed by the payment network; (b) real-time or near real-time analysis for potential collusion by collecting and storing relevant transaction, merchant, and cardholder data that is retrievable to perform the real-time collusion analysis; (c) real-time or near real-time alerts sent to issuers that indicate potential collusion to enable issuers to proactively prevent fraudulent purchase, thereby facilitating improved processing bandwidth and efficiency of the issuer's computing system; and (d) reduced volume of fraudulent product deliveries for a product distribution service that may result in liability issues for the distribution service and reduced capacity for non-fraudulent product deliveries.

Described herein are computer systems such as a payment processor, a user device, and a data mapping computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to authenticate remote purchases via a user device.

FIG. 1 is a schematic diagram illustrating an example collusion analytics (CA) platform 10 that includes a multi-party payment card system 20 for detecting potential collusion between two or more parties involved in a transaction. The present disclosure relates to payment card system 20, such as a credit card payment system using the MasterCard® payment card system payment network 28 (also referred to as an "interchange" or "interchange network"). MasterCard® payment card system payment network 28 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 20, a financial institution such as an issuer 30 issues a payment card for an account, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment card (also known as a financial transaction card), merchant 24 requests authorization from acquirer 26 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 26. Alternatively, acquirer 26 may authorize a third party to perform transaction processing on its behalf. In this case, the point-of-interaction terminal will be configured to communicate with the third party. Such a third party is usually called a "merchant processor" or an "acquiring processor."

Using payment card system payment network 28, the computers of acquirer 26 or the merchant processor will communicate with the computers of issuer 30, to determine whether the cardholder's account 32 is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

An authentication process may also be performed to verify that cardholder 22 is physically present when making a purchase with cardholder's account 32. In the embodiments described herein, platform 10 further includes a CA system 100 configured to facilitate automatic detection of collusion between merchants and cardholders. As used herein, collusion is an act of fraudulent or otherwise secret conspiracy between two or more parties. In particular, collusion between merchants (e.g, merchant 24) and cardholders (e.g., cardholder 22) may be performed to attempt to fraudulently shift liability to issuer 30. In the example embodiment, system 100 is communicatively coupled to payment network 28 and issuer 30 to detect collusion as described herein. In other embodiments, system 100 is communicatively coupled to payment system 20 in a different configuration.

Figure 2:
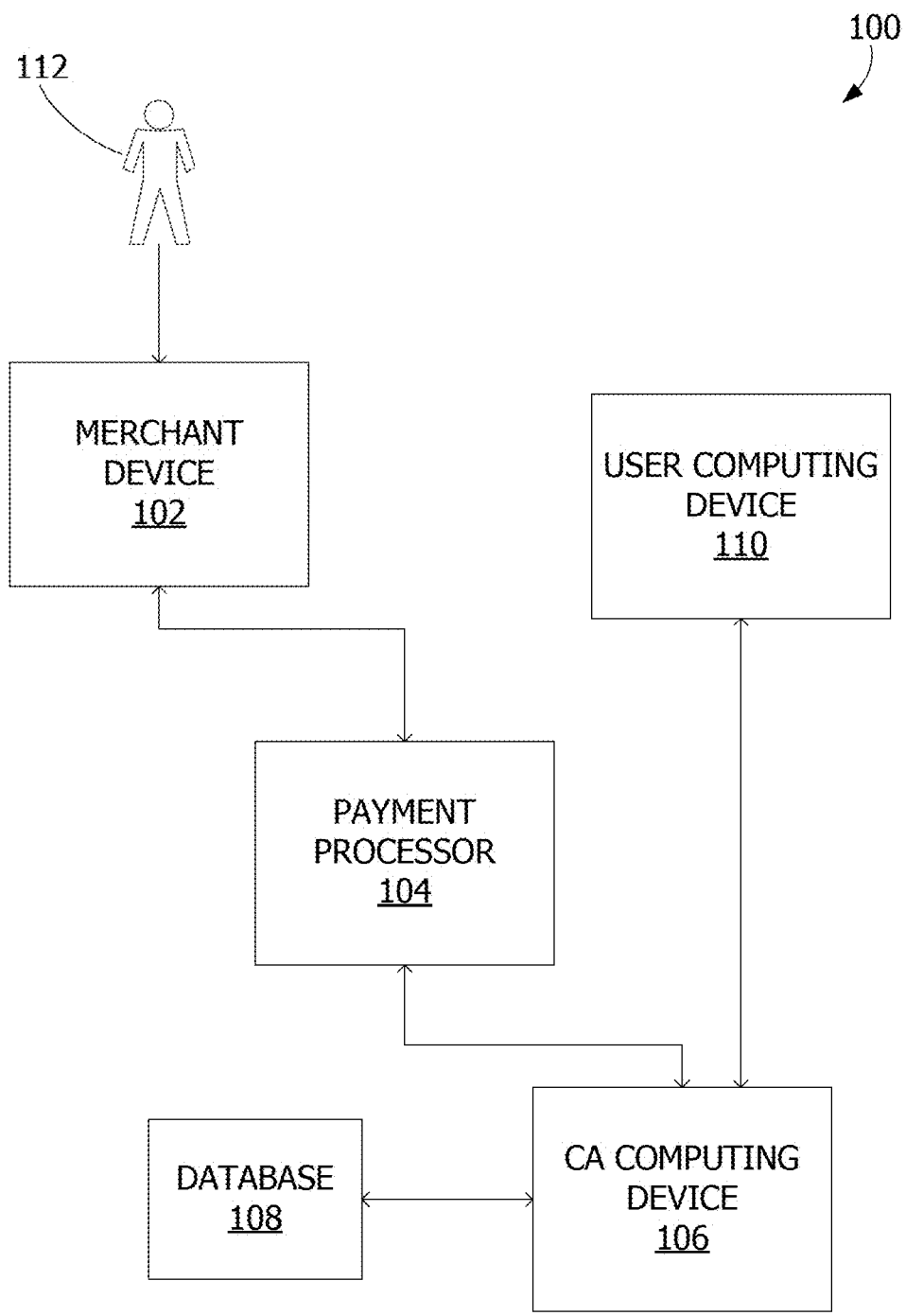

FIG. 2 is a block diagram of CA system 100 that may be used with CA platform 10 (shown in FIG. 1). System 100 includes a merchant device 102, a payment processor 104, a CA computing device 106, a database 108, and a user computing device 110. In other embodiments, system 100 may include additional, fewer, or alternative computing devices, including those described elsewhere herein.

Merchant device 102 is associated with a merchant (e.g., merchant 24, shown in FIG. 1) and is configured to facilitate purchases with the merchant. In the example embodiment, merchant device 102 is configured to facilitate CNP transactions with customers by remotely receiving and processing payment information from a user computing device (not shown). When a purchase is initiated and payment information is received, merchant device 102 transmits the payment information as transaction data to payment processor 110.

Payment processor 104 is associated with payment network 28 (shown in FIG. 1). Transaction data associated with one or more transactions is sent to payment processor 104 for processing. In some embodiments, during processing, payment processor 104 is configured to generate authentication challenges for each transaction of the transaction data. In other embodiments, merchant device 102 is configured to generate the authentication challenges. Alternatively, an issuer (i.e., a financial institution that provides a payment account to cardholders) may generate the authentication challenge. The authentication challenges are provided to a cardholder 112 associated with the transaction and prompt cardholder 112 to provide authentication to verify that the legitimate cardholder is performing the transaction. The response from the cardholder is transmitted to merchant device 102, payment processor 104, and/or an issuer (e.g., user computing device 110) to determine a result of the authentication challenge.

In one example, the merchant and cardholder 112 collaborate together to perform fraud against the issuer. In particular, cardholder 112 initiates a transaction through merchant device 102. Since cardholder 112 has initiated the transaction, an authentication challenge will verify the identity of cardholder 112. Once the identity of cardholder 112 is verified, liability for fraud shifts from the merchant to the issuer. After cardholder 112 has secured the purchased product, cardholder 112 disputes the transaction as fraudulent despite knowing that the legitimate cardholder 112 performed the transaction. The merchant, in collaboration with cardholder 112, indicates that cardholder 112 had been verified by an authentication challenge and therefore the liability is with the issuer. Accordingly, the issuer is forced to cancel the charge for cardholder 112 and reimburse the merchant for the purchased product despite cardholder 112 keep the purchased product.

CA computing device 106 is configured to provide a collusion detection service to issuers, acquirers (i.e., financial institutions associated with the merchant), and other parties for detecting potential collusion between merchants and cardholders. An issuer or other party registers for the collusion detection service to receive an alert if potential collusion is detected by CA computing device 106. In some embodiments, the users may be automatically enrolled in the collusion detection service and CA computing device 106 provides the users with an option to opt-out of the service. In at least some embodiments, CA computing device 106 is configured to provide the users with options to selectively opt-in, opt-out, and/or otherwise customize various features or subservices of the collusion detection service described herein. In the example embodiment, user computing device 110 is in communication with CA computing device 106 and is associated with a party that has registered for the collusion detection service to receive alerts. In other embodiments, user computing device 110 may be part of payment processor 104 to send the alerts during payment processing to an issuer or other party registered for the service.

CA computing device 106 is configured to collect transaction data, cardholder data, and merchant data and store the collected data in database 108. In some embodiments, database 108 is part of CA computing device 106. The transaction data may include a transaction amount, a date and time stamp, a PAN, a form of payment (e.g., digital wallet, payment card, etc.), a cardholder identifier, and a merchant identifier. The transaction data may further include information unrelated to payment of the transaction, such as IP address, browser type, or device type collected from an HTTP header associated with a device used by cardholder 112 to initiate the transaction. The merchant data includes information associated with the merchant, such as merchant type (e.g., POS, digital only, or POS and digital sales), merchant product category, and other merchant-related data. The cardholder data includes historical transaction data associated with a particular cardholder or payment account.

CA computing device 160 is configured to receive transaction data from payment processor 104. In other embodiments, CA computing device 106 may receive the transaction data from another computing device. Alternatively, CA computing device 106 may be part of payment processor 104 and is configured to process the transaction data. In one embodiment, the transaction data is received by CA computing device 16 when a candidate transaction of the transaction data is initiated at merchant device 102 with cardholder 112. Based on the transaction data, CA computing device 106 retrieves the merchant data associated with the candidate merchant of merchant device 102. In some embodiments, CA computing device 106 also retrieves cardholder data associated with cardholder 112. At least some of the retrieved data may be retrieved from payment processor 104 and/or user computing device 110.

Based upon the transaction, merchant, and cardholder data, CA computing device 106 is configured to generate collusion analytics data as described herein. The collusion analytics data is a plurality of data elements that are generated by aggregating, deriving, analyzing, and/or otherwise manipulating the transaction, merchant, and cardholder data. Each data element of the collusion analytics data is associated with a specific, predefined factor that may indicate potential collusion between the candidate merchant and the candidate cardholder. In the example embodiment, the collusion analytics data is separated into merchant analytics data and cardholder analytics data. The merchant analytics data include data elements associated with the merchant and the cardholder analytics data includes data elements associated with cardholder 112.

CA computing device 106 is configured to analyze the collusion analytics data to identify potential collusion. For example, CA computing device 106 is configured to compare the collusion analytics to one or more thresholds to calculate a collusion confidence score to the candidate transaction. In at least some embodiments, the thresholds may be customized by the user to facilitate collusion detect according to the particular user's requirements. The collusion confidence score is an aggregated value indicating the likelihood or unlikelihood of collusion between the merchant and cardholder 112. CA computing device 106 is configured to determine, based at least partially on the collusion confidence score, if potential collusion may be occurring between the merchant of merchant device 102 and cardholder 112.

In the example embodiment, CA computing device 106 is configured to notify payment processor 104 and/or user computing device 110 when the candidate transaction has a relatively acceptable amount of risk of collusion associated with it. That is, when the probability of collusion is determined to be below a predetermined threshold, CA computing device 106 indicates that collusion is unlikely. However, if a relatively high risk of collusion is determined, CA computing device 106 is configured to transmit a collusion alert to payment processor 104 and/or user computing device 110. The collusion alert indicates that the candidate transaction is potentially part of collusion between the merchant and cardholder 112. In at least some embodiments, payment processor 104 and/or user computing device 110 are configured to automatically decline the candidate transaction in response to a collusion alert. Alternatively, the collusion alert is used within an authorization process to determine whether or not to authorize the candidate transaction. CA computing device 106 is configured to maintain a record of merchants and cardholders associated with any collusion alerts. In one example, CA computing device 106 maintains a blacklist of merchants and cardholders that have potentially performed collusion previously. In another example, CA computing device 106 updates the merchant or cardholder data to indicate the previous collusion. By maintaining a record of the previous collusion, CA computing device 106 prevents repeat offenders of collusion.

In some embodiments, CA computing device 106 is configured to transmit other alerts, such as a challenge alert. A challenge alert indicates that although the potential risk of collusion is not sufficient to generate a collusion alert, the risk is sufficient such that additional authentication challenges are recommended. In one embodiment, the additional authentication challenge is a stronger authentication type in comparison to the first authentication challenge. For example, if cardholder 112 provided a password for the first authentication challenge, the second authentication challenge may request biometric authentication information (e.g., fingerprint, iris scan, etc.) or device authentication information. In certain embodiments, the additional authentication challenge may shift at least a portion of the fraud liability to cardholder 112.

In at least some embodiments, each data element of the collusion analytics data is compared to one or more threshold value. Based on the comparison, a score value is assigned to the data element. For example, a data element may be compared to a single threshold to assign a '1' or a '0' value to the data element to indicate if the data element is indicative of collusion. These score values are aggregated together to generate a collusion confidence score associated with the candidate transaction.

FIG. 10 is an example model 1000 that includes example data collected by CA system 100 (shown in FIG. 2) and analytics provided by CA system 100 to detect collusion. In particular, model 1000 depicts an analysis performed by CA system 100 on data associated with a cardholder and merchant of an example candidate transaction to detect potential collusion. Model 1000 is shown for exemplary purposes only, and is not intended to limit the features and functionality of CA system 100 as described herein. FIGS. 3-5 are subsets of model 1000 that include the example data and analytics. In particular, FIG. 3 is a table 300 illustrating merchant analytics data, FIG. 4 is a table 400 illustrating cardholder analytics data, and FIG. 5 is a table 500 illustrating collusion scoring based on tables 300 and 400. Tables 300, 400, 500 include data from an example candidate transaction as described herein. Accordingly, additional, fewer, or alternative data may be used or generated during the collusion detection service.

In the example embodiment, CA computing device 106 (shown in FIG. 2) is configured to initiate a collusion detection process when a candidate transaction is received that is associated with a party registered for the collusion detection service. In this example, CA computing device 106 collects or determines the merchant data shown in Table 1 and the cardholder data shown in Table 2 from model 1000 for the merchant and cardholder associated with the candidate transaction. In particular, CA computing device 106 determines a type of merchant (e.g., digital sales, point-of-sale (POS), or both) and a type of product purchased (e.g., physical or digital). The merchant participation time refers to the length of time that the merchant has been in business and performing transactions. In the example embodiment, the merchant data further includes a total number of transactions, a number of unique payment cards, unique bank identification numbers (BINs), and unique proxy IPs used for the transactions, a total number of physical deliveries of products, a number of unique delivery addresses, a number of authenticated transactions, a number of transactions with "strong" (e.g., biometric authentication and device authentication) types of authentication performed, and a number of transactions initiated within geographical regions that are associated with a relatively high risk of collusion and/or other forms of fraud. This merchant data may be collected for transactions occurring within a predetermined period of time (e.g., five years) or the merchant data may not be time restricted. In other embodiments, other merchant data may be collected, including those described elsewhere herein.

TABLE 1

| MERCHANT DATA | |
|---|---|
| Merchant Type | Digital Only |
| Product Type | Physical |
| Merchant Participation | 1 year |
| Total Transactions | 50 |
| Unique Cards | 20 |
| Unique BINs | 5 |
| Unique Proxies | 25 |
| Total Deliveries | 50 |
| Unique Delivery Addresses | 15 |
| Authenticated Transactions | 35 |
| Transactions with Strong Authentication | 25 |
| Transactions in High Risk Authentication Region | 0 |

In addition to the merchant data shown in Table 1, CA computing device 106 collects cardholder data, such as the cardholder data shown in Table 2. In the example embodiment, the cardholder data includes a transaction mode used to perform the candidate transaction (e.g., digital wallet or non-wallet), a transaction history with a similar merchant, historical transactions at a similar price point, previous chargeback history, and previous authenticated transactions with other merchants. The cardholder data is associated a payment card used for the candidate transaction and/or other payment cards and accounts associated with the cardholder. In the example embodiment, the cardholder data include Boolean or binary values. Similar to the merchant data, the cardholder data may be associated with transactions occurring within a predetermined period of time or the cardholder data may not be time restricted. In other embodiments, other values may be collected as part of the cardholder data.

TABLE 2

| CARDHOLDER DATA | |
|---|---|
| Transaction Mode | Non-Wallet |
| Transaction History with Similar Merchant | Yes |
| Transactions with Similar Price Point | No |
| Previous Chargeback History | No |
| Authenticated Across Other Merchants | Yes |

With respect to FIGS. 3 and 4, CA computing device 106 is configured to use the retrieved merchant and cardholder data to generate the collusion analytics data. The merchant analytics data and cardholder analytics data in tables 300 and 400 respectively are separated into a plurality of data elements 305, 405. Each data element 305, 405 is configured to provide information about a different aspect of the merchant and cardholder data to provide a score value 310, 410 associated with each data element 305, 405. Table 300 includes a calculations column 301 that illustrates the calculation performed using the data from Table 1.

In the example embodiment, CA computing device is configured to compare data elements 305, 405 with threshold values 315 or other comparison values. Threshold values 315 are used to facilitate determining whether or not a specific data element 305, 405 is indicative of potential fraud. In the example embodiment, each data element 305, 405 is assign score value 310, 410 based on the comparison. For example, in table 300, the number of unique payment cards used to complete transactions with the merchant divided by the total number of transactions is compared to a threshold value of 25%. If the number of unique payment cards exceeds 25% of the total number of transactions, a score value of '0' is assigned to that data element 305, which indicates potential fraud. Using the merchant data within Table 1, for example, 20 unique cards for 50 total transactions equates to 40% of the transactions using unique payment cards. As such, the score value of '0' is assigned. In another example, rather than a percentage or numerical threshold, at least some score values 310, 410 are determined based on a Boolean comparison (e.g., data elements 405) or comparing data elements 305, 405 to a list of values (e.g., merchant type and product type in table 300). In some embodiments, at least a portion of threshold values 315 are adjustable by the users of the collusion detection service to enable the users to customize the collusion analytics data. That is, the users can customize what behavior or analytics that CA computing device 106 will determine to be indicative of potential collusion.

With respect now to FIGS. 3-5, each score value 310 is aggregated to generate a merchant collusion score 505. Similarly, each score value 410 is aggregated to generate a cardholder collusion score 510. In some embodiments, weighting factors may be applied to one or more score values 310, 410 to emphasize or deemphasize particular score values 310, 410 when generating merchant and cardholder collusion scores 505, 510. Merchant collusion score 505 and cardholder collusion score 510 are combined to generate a collusion confidence score 515 that indicates a level of confidence that the merchant and cardholder are or are not colluding. In the example embodiment, CA computing device 106 is configured to apply weighting factors to each of merchant collusion score 505 and cardholder collusion score 510. For example, in table 500, the applied weighting factors place additional emphasis on merchant collusion score 505 in comparison to cardholder collusion score 510. In certain embodiments, the users of the collusion detection service may define the weighting factors. Alternatively, merchant collusion score 505, cardholder collusion score 510, and/or collusion confidence score 515 are calculated, derived, or otherwise generated using a different method.

Once collusion confidence score 515 is calculated, score 515 is compared to one or more predefined confidence thresholds 520. Confidence thresholds 520 define a plurality of risk regions that indicate the risk of collusion associated with the candidate transaction. For example, using the merchant and cardholder data from Tables 1 and 2, collusion score 515 is calculated to be 81. Collusion score 515 is compared to confidence thresholds 520 to determine a course of action taken by CA computing device 106. In this example, based on the comparison, collusion score 515 is within an acceptable risk region. Accordingly, CA computing device 106 is configured to notify payment processor 104 (shown in FIG. 2) and/or another computing device that the risk of collusion for the candidate transaction is relatively low.

However, if collusion score 515 is between 40 and 70 in this example, CA computing device 106 is configured to transmit a challenge alert to indicate that additional authentication of the cardholder is recommended. If collusion score 515 is less than 40, CA computing device 106 determines collusion score 515 is indicative of potential collusion and transmits a collusion alert. In other embodiments, additional, fewer, and/or alternative confidence thresholds 520 are used. In certain embodiments, confidences thresholds 520 are customizable by the users of the collusion detection service.

Figure 6:
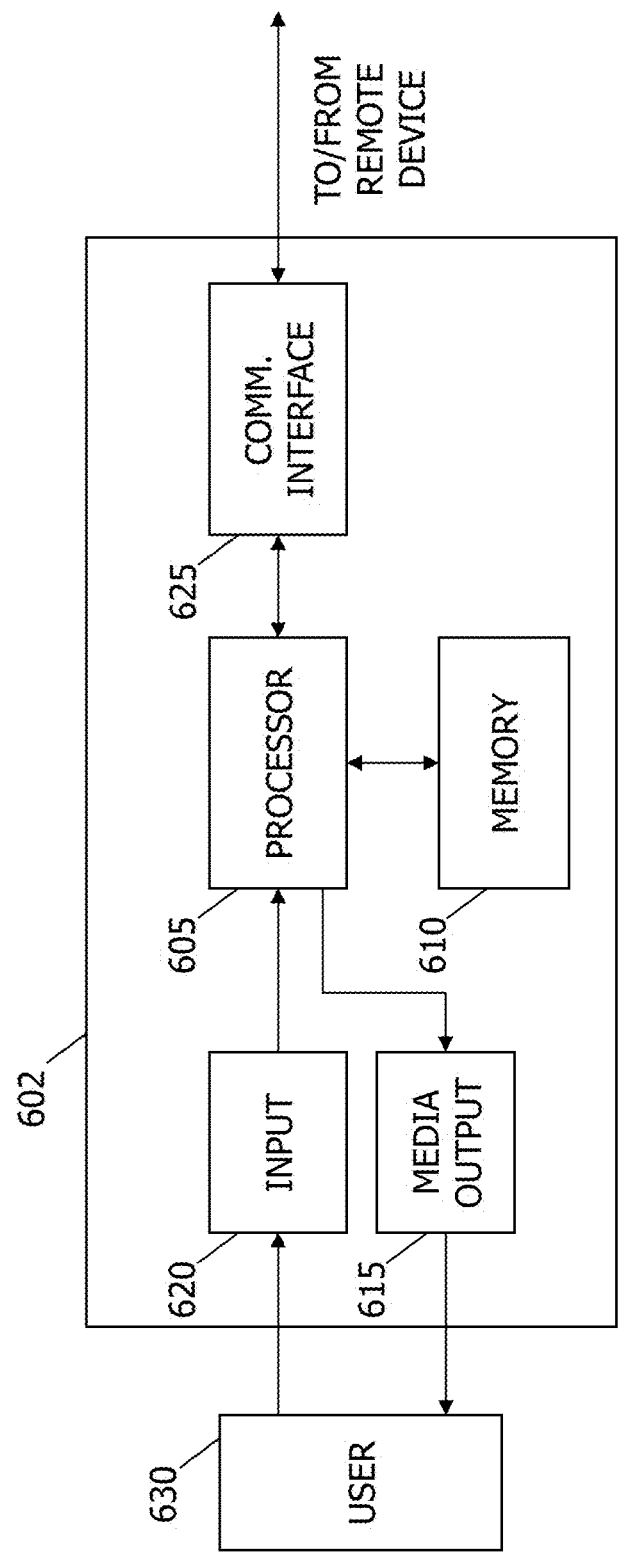

FIG. 6 depicts an exemplary configuration of a remote or user computing device 602, such as merchant device 102 and user computing device 110 shown in FIG. 2. Computing device 602 may include a processor 605 for executing instructions. In some embodiments, executable instructions may be stored in a memory area 610. Processor 605 may include one or more processing units (e.g., in a multi-core configuration). Memory area 610 may be any device allowing information such as executable instructions and/or other data to be stored and retrieved. Memory area 610 may include one or more computer-readable media.

Computing device 602 may also include at least one media output component 615 for presenting information to a user 630. Media output component 615 may be any component capable of conveying information to user 630. In some embodiments, media output component 615 may include an output adapter, such as a video adapter and/or an audio adapter. An output adapter may be operatively coupled to processor 605 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 615 may be configured to present an interactive user interface (e.g., a web browser or client application) to user 630.

In some embodiments, computing device 602 may include an input device 620 for receiving input from user 630. Input device 620 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 615 and input device 620.

Computing device 602 may also include a communication interface 625, which may be communicatively coupleable to a remote device such as user computing device 110 (shown in FIG. 2). Communication interface 625 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 610 are, for example, computer-readable instructions for providing a user interface to user 630 via media output component 615 and, optionally, receiving and processing input from input device 620. A user interface may include, among other possibilities, a web browser and client application. Web browsers enable users 630 to display and interact with media and other information typically embedded on a web page or a website from a web server associated with a merchant. A client application allows users 630 to interact with a server application associated with, for example, a vendor or business.

Figure 7:
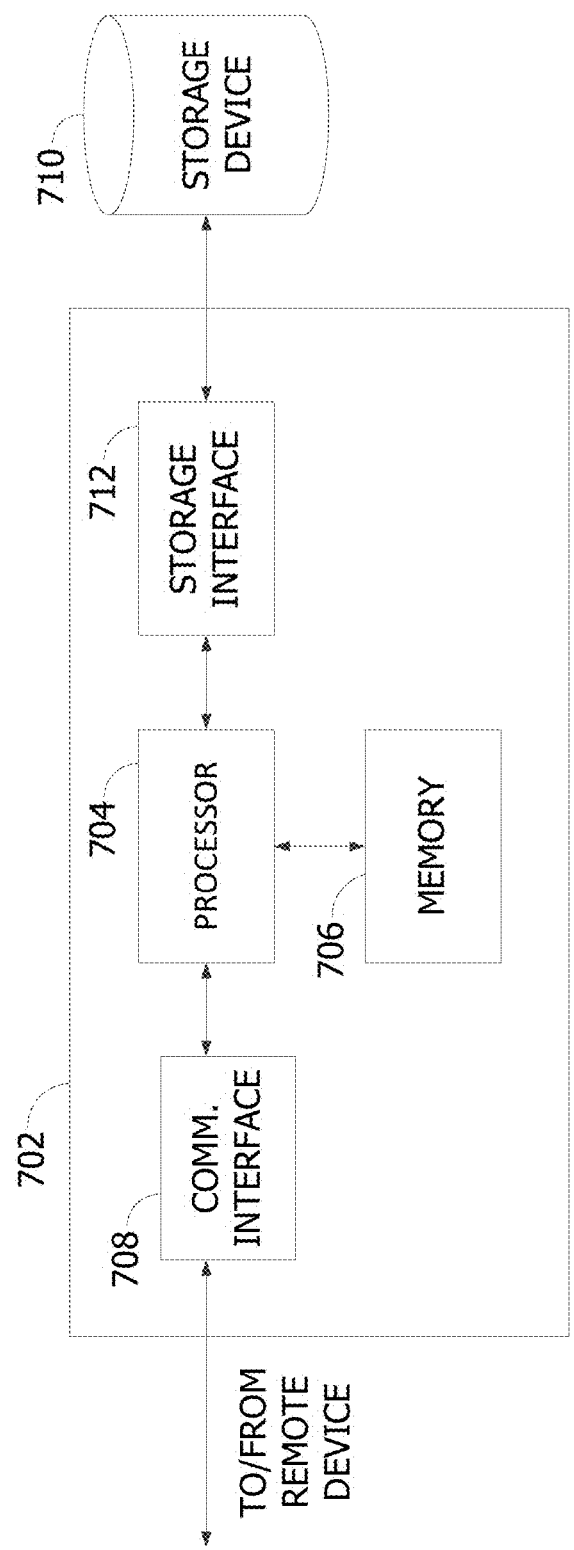

FIG. 7 depicts an exemplary configuration of a host computing device 702, such as merchant device 102, payment processor 104, CA computing device 106, and user computing device 110 (shown in FIG. 2). Host computing device 702 may include a processor 705 for executing instructions. Instructions may be stored in a memory area 706, for example. Processor 704 may include one or more processing units (e.g., in a multi-core configuration).

Processor 704 may be operatively coupled to a communication interface 708 such that host computing device 702 may be capable of communicating with a remote device such as computing device 602 shown in FIG. 6 or another host computing device 702. For example, communication interface 708 may receive requests from user computing device 602 via the Internet.

Processor 704 may also be operatively coupled to a storage device 710. Storage device 710 may be any computer-operated hardware suitable for storing and/or retrieving data. In some embodiments, storage device 710 may be integrated in host computing device 702. For example, host computing device 702 may include one or more hard disk drives as storage device 710. In other embodiments, storage device 710 may be external to host computing device 702 and may be accessed by a plurality of host computing devices 702. For example, storage device 710 may include multiple storage units such as hard disks or solid state disks in a redundant array of inexpensive disks (RAID) configuration. Storage device 710 may include a storage area network (SAN) and/or a network attached storage (NAS) system.

In some embodiments, processor 704 may be operatively coupled to storage device 710 via a storage interface 712. Storage interface 712 may be any component capable of providing processor 704 with access to storage device 710. Storage interface 712 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 704 with access to storage device 710.

Memory areas 610 (shown in FIG. 6) and 706 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 8:
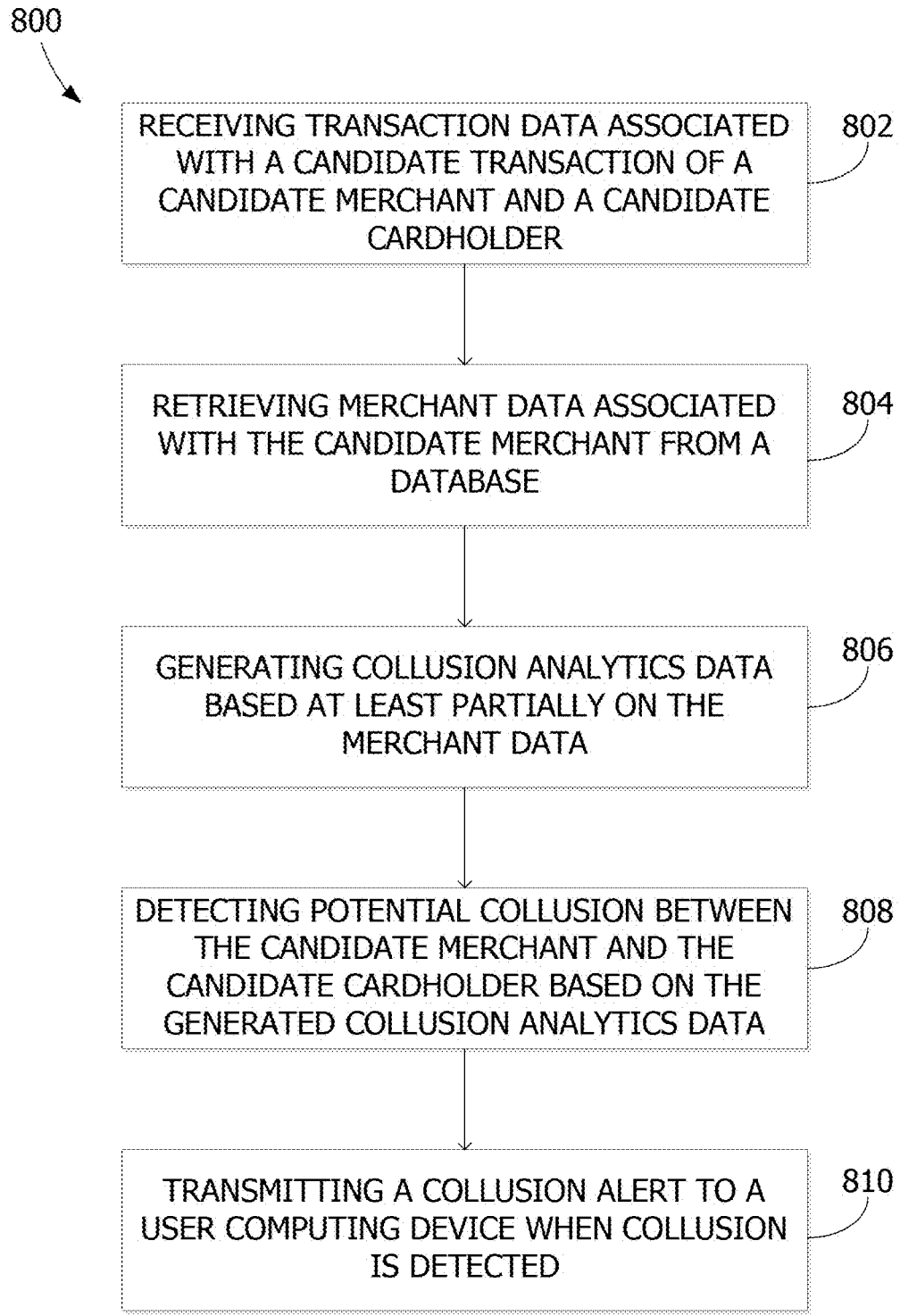

FIG. 8 is a flow diagram of an example method 800 for detecting collusion between merchants and cardholders using a collusion analytics system, such as system 100 (shown in FIG. 2). In the example embodiment, method 800 is performed by a CA computing device. In certain embodiments, method 800 may be at least partially performed by a different computing device. In other embodiments, method 800 may include additional, fewer, or alternative steps, including those described elsewhere herein.

Method 800 begins with the CA computing device receiving 802 transaction data associated with a candidate transaction. The transaction data includes a merchant identifier associated with a candidate merchant and a cardholder identifier associated with a candidate cardholder. The CA computing device retrieves 804 merchant data associated with the candidate merchant from a database. The CA computing device also retrieves cardholder data associated with the candidate cardholder from the database. The CA computing device generates 806 merchant collusion analytics data based at least partially on the merchant data. The generated collusion analytics may also be based on the cardholder data. The CA computing device detects 808 whether or not any potential collusion is occurring between the candidate merchant and candidate cardholder based on the generated collusion data. In some embodiments, the CA computing device calculates one or more collusion scores and compares these scores to one or more thresholds to determine if collusion is occurring. If the CA computing device detects 808 potential collusion, the CA computing device transmits 810 a collusion alert to an user computing device.

Figure 9:
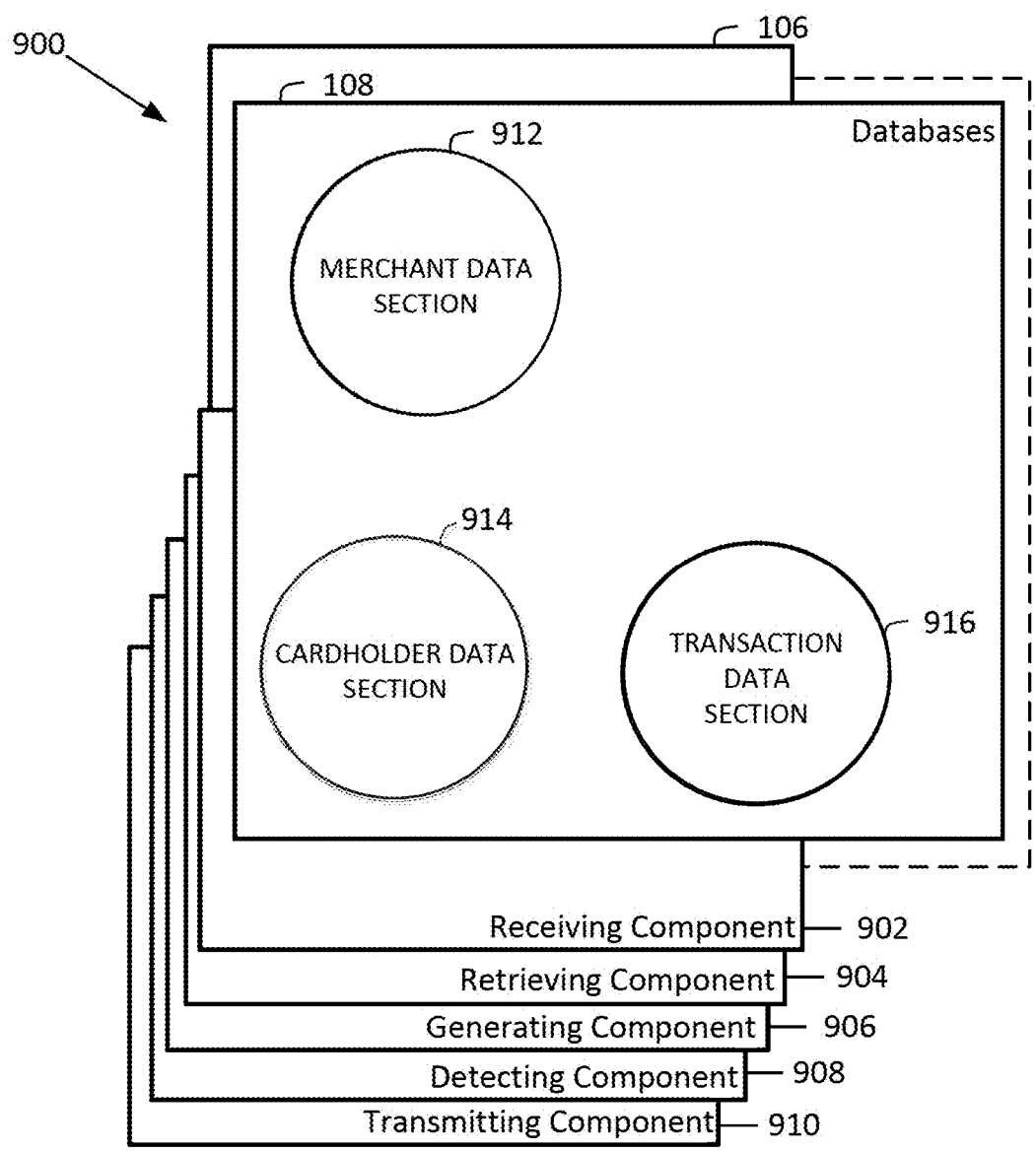

FIG. 9 is a diagram 900 of components of one or more example computing devices that may be used in the method shown in FIG. 8. FIG. 9 further shows a configuration of databases including at least database 108 (shown in FIG. 2). Database 108 is coupled to several separate components within CA computing device 106 (shown in FIG. 2), which perform specific tasks.

CA computing device 106 includes a receiving component 902 configured to receive transaction data associated with candidate transaction of a candidate merchant and a candidate cardholder. CA computing device 106 further includes a retrieving component 904 configured to retrieve merchant data associated with the candidate merchant from a database. In some embodiments, retrieving component 902 is also configured to retrieve cardholder data associated with the candidate cardholder of the candidate transaction from the database. CA computing device 106 also includes a generating computing 906 configured to generate collusion analytics data based at least partially on the merchant data and, in at least some embodiments, the cardholder data. CA computing device 106 further includes a detecting component 908 configured to detect potential collusion between the candidate merchant and the candidate cardholder based on the generated collusion analytics data. The CA computing device 106 further includes a transmitting component 910 configured to transmit a collusion alert to an user computing device when potential collusion is detected. In some embodiments, transmitting component 910 is further configured to transmit a challenge alert to a payment network.

In an exemplary embodiment, database 108 is divided into a plurality of sections, including but not limited to, merchant data section 912, cardholder data section 914, and a transaction data section 916. These sections within database 108 are interconnected to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A collusion analytics (CA) computing device for detecting collusion between merchants and cardholders involved in purchase transactions, the CA computing device comprising a processor and a memory in communication with the processor, the processor programmed to:

receive transaction data associated with a candidate transaction of a candidate merchant and a candidate cardholder, wherein the candidate transaction is a purchase transaction initiated by the candidate cardholder using a payment card with the candidate merchant;

retrieve, based on the transaction data associated with the candidate transaction, merchant data associated with the candidate merchant from a database;

retrieve, based on the transaction data associated with the candidate transaction, cardholder data associated with the candidate cardholder from the database;

generate collusion analytics data based on the merchant data, the cardholder data, and the transaction data, wherein the collusion analytics data includes a plurality of data elements, and wherein each data element is associated with a predefined value that indicates a respective likelihood of collusion between the candidate merchant and the candidate cardholder for the candidate transaction;

calculate a collusion confidence score for the candidate transaction based on the generated collusion analytics data, wherein the collusion confidence score indicates a level of confidence that collusion between the candidate merchant and the candidate cardholder occurred with the candidate transaction;

receive, from one or more user computing devices associated with one or more users, (i) a first threshold indicating the collusion confidence score determined by the users to be associated with legitimate transactions and (ii) a second threshold indicating the collusion confidence score determined by the users to be associated with transactions involving collusion, wherein the one or more user computing devices include at least one of a payment processor and an issuer computing device of an issuer of the payment card used during the candidate transaction; and transmit a collusion alert, during processing of the candidate transaction based on the collusion confidence score, to the one or more user computing devices, wherein the collusion alert causes the one or more user computing devices to one of (i) decline the candidate transaction in response to the confidence collusion score being above the second threshold, (ii) issue a supplementary authentication challenge to a computing device of the candidate cardholder as a predicate to authorizing the candidate transaction in response to the collusion confidence score being above the first threshold and below the second threshold, and (iii) proceed with authorizing the candidate transaction in response to the collusion confidence score being below the first threshold.

2. The CA computing device in accordance with claim 1, wherein the cardholder data includes at least one of a payment method, a transaction volume, a transaction velocity, a chargeback history, a fraud history, and an authentication history associated with the candidate cardholder.

3. The CA computing device in accordance with claim 1, wherein the processor is further programmed to calculate a cardholder collusion score and a merchant collusion score based on the generated collusion analytics.

4. The CA computing device in accordance with claim 3, wherein the processor is further programmed to:

apply a first weighting factor to the cardholder collusion score and a second weighting factor to the merchant collusion score; and calculate the collusion confidence score based on the cardholder collusion score with the first weighting factor and the merchant collusion score with the second weighting factor.

5. The CA computing device in accordance with claim 1, wherein the one or more user computing devices are associated with a financial institution, the financial institution associated with at least one of the candidate merchant and the candidate cardholder.

6. The CA computing device in accordance with claim 1, wherein the merchant data includes at least one of a merchant type, a product type, a merchant participation time period, and a number of at least one of total transactions, unique payment cards, bank identification numbers (BINs), unique proxies, total deliveries, unique delivery address, authenticated transactions, and transactions initiated within a predefined geographical region associated with the candidate merchant.

7. The CA computing device in accordance with claim 3, wherein the plurality of data elements include (i) data elements associated with the candidate cardholder and (ii) data elements associated with the candidate merchant, and wherein the processor is further programmed to:

calculate the cardholder collusion score based upon the data elements and respective predefined values associated with the candidate cardholder;

calculate the merchant collusion score based upon the data elements and respective predefined values associated with the candidate merchant; and combine the cardholder collusion score and the merchant collusion score to calculate the collusion confidence score for the candidate transaction.

8. A method for detecting collusion between a candidate merchant and a candidate cardholder involved in a purchase transaction, said method comprising:

receiving, at a collusion analytics (CA) computing device, transaction data from a payment processor of a payment processing network associated with a candidate transaction of a candidate merchant and a candidate cardholder, wherein the candidate transaction is a purchase transaction initiated by the candidate cardholder using a payment card with the candidate merchant;

retrieving, based on the transaction data associated with the candidate transaction, merchant data associated with the candidate merchant from a database;

retrieving, based on the transaction data associated with the candidate transaction, cardholder data associated with the candidate cardholder from the database;

generating, by the CA computing device, collusion analytics data based at least partially on the merchant data the cardholder data, and the transaction data, wherein the collusion analytics data includes a plurality of data elements, and wherein each data element is associated with a predefined value that indicates a respective likelihood of collusion between the candidate merchant and the candidate cardholder for the candidate transaction;

calculating a collusion confidence score for the candidate transaction based on the generated collusion analytics data, wherein the collusion confidence score indicates a level of confidence that collusion between the candidate merchant and the candidate cardholder occurred with the candidate transaction;

receiving, from one or more user computing devices associated with one or more users, (i) a first threshold indicating the collusion confidence score determined by the users to be associated with legitimate transactions and (ii) a second threshold indicating the collusion confidence score determined by the users to be associated with transactions involving collusion, wherein the one or more user computing devices include at least one of a payment processor and an issuer computing device of an issuer of the payment card used during the candidate transaction; and transmitting, by the CA computing device, a collusion alert, during processing of the candidate transaction based on the collusion confidence score, to the one or more user computing devices, wherein the collusion alert causes the one or more user computing devices to one of (i) decline the candidate transaction in response to the confidence collusion score being above the second threshold, (ii) issue a supplementary authentication challenge to a computing device of the candidate cardholder as a predicate to authorizing the candidate transaction in response to the collusion confidence score being above the first threshold and below the second threshold, and (iii) proceed with authorizing the candidate transaction in response to the collusion confidence score being below the first threshold.

9. The method in accordance with claim 8, wherein the cardholder data includes at least one of a payment method, a transaction volume, a transaction velocity, a chargeback history, a fraud history, and an authentication history associated with the candidate cardholder.

10. The method in accordance with claim 8, wherein generating the collusion analytics further comprises calculating a cardholder collusion score and a merchant collusion score based on the generated collusion analytics.

11. The method in accordance with claim 10, wherein generating the collusion analytics further comprises:

applying a first weighting factor to the cardholder collusion score and a second weighting factor to the merchant collusion score; and calculating, by the CA computing device, the collusion confidence score based on the cardholder collusion score with the first weighting factor and the merchant collusion score with the second weighting factor.

12. The method in accordance with claim 8, wherein the one or more user computing devices are associated with a financial institution, the financial institution associated with at least one of the candidate merchant and the candidate cardholder.

13. The method in accordance with claim 8, wherein the merchant data includes at least one of a merchant type, a product type, a merchant participation time period, and a number of at least one of total transactions, unique payment cards, bank identification numbers (BINs), unique proxies, total deliveries, unique delivery address, authenticated transactions, and transactions initiated within a predefined geographical region associated with the candidate merchant.

14. At least one non-transitory computer-readable storage media having computer-executable instructions embodied thereon, wherein when executed by at least one processor, the computer-executable instructions cause the processor to:

receive transaction data from a payment processor of a payment processing network associated with a candidate transaction of a candidate merchant and a candidate cardholder, wherein the candidate transaction is a purchase transaction initiated by the candidate cardholder using a payment card with the candidate merchant;

retrieve, based on the transaction data associated with the candidate transaction, merchant data associated with the candidate merchant from a database;

retrieve, based on the transaction data associated with the candidate transaction, cardholder data associated with the candidate cardholder from the database;

generate collusion analytics data based on the merchant data the cardholder data, and the transaction data, wherein the collusion analytics data includes a plurality of data elements, and wherein each data element is associated with a predefined value that indicates a respective likelihood of collusion between the candidate merchant and the candidate cardholder for the candidate transaction;

calculate a collusion confidence score for the candidate transaction based on the generated collusion analytics data, wherein the collusion confidence score indicates a level of confidence that collusion between the candidate merchant and the candidate cardholder occurred with the candidate transaction;

receive, from one or more user computing devices associated with one or more users, (i) a first threshold indicating the collusion confidence score determined by the users to be associated with legitimate transactions and (ii) a second threshold indicating the collusion confidence score determined by the users to be associated with transactions involving collusion, wherein the one or more user computing devices include at least one of a payment processor and an issuer computing device of an issuer of a payment card used during the candidate transaction; and transmit a collusion alert, during processing of the candidate transaction based on the collusion confidence score, to the one or more user computing devices, wherein the collusion alert causes the one or more user computing devices to one of (i) decline the candidate transaction in response to the confidence collusion score being above the second threshold, (ii) issue a supplementary authentication challenge to a computing device of the candidate cardholder as a predicate to authorizing the candidate transaction in response to the confidence collusion score being above the first threshold and below the second threshold, and (iii) proceed with authorizing the candidate transaction in response to the collusion confidence score being below the first threshold.

15. The computer-readable storage media in accordance with claim 14, wherein the cardholder data includes at least one of a payment method, a transaction volume, a transaction velocity, a chargeback history, a fraud history, and an authentication history associated with the candidate cardholder.

16. The computer-readable storage media in accordance with claim 14, wherein the computer-executable instructions further cause the processor to calculate a cardholder collusion score and a merchant collusion score based on the generated collusion analytics.

17. The computer-readable storage media in accordance with claim 16, wherein the computer-executable instructions further cause the processor to:
apply a first weighting factor to the cardholder collusion score and a second weighting factor to the merchant collusion score; and
calculate the collusion confidence score based on the cardholder collusion score with the first weighting factor and the merchant collusion score with the second weighting factor.

18. The computer-readable storage media in accordance with claim 14, wherein the one or more user computing devices are associated with a financial institution, the financial institution associated with at least one of the candidate merchant and the candidate cardholder.

19. The computer-readable storage media in accordance with claim 14, wherein the merchant data includes at least one of a merchant type, a product type, a merchant participation time period, and a number of at least one of total transactions, unique payment cards, bank identification numbers (BINs), unique proxies, total deliveries, unique delivery address, authenticated transactions, and transactions initiated within a predefined geographical region associated with the candidate merchant.

* * * * *